Patented July 3, 1934

1,965,191

UNITED STATES PATENT OFFICE 1,965,191

EMULSIFIABLE OXIDIZED HYDROCARBON AND PREPARATION OF SAME

Julius Hyman, Chicago, Ill., assignor to Velsicol Corporation, Chicago, Ill., a corporation of Illinois No Drawing. Application January 15, 1934,
Serial No. 706,792

14 Claims. (Cl. 260—116)

The present invention relates to emulsifiable compounds derived from the atmospheric oxidation and subsequent alkali treatment of the highly unsaturated hydrocarbons resulting from the polymerization of cracked gasoline by means of siliceous or other contact catalysts, such as active clay.

The emulsifiable compounds formed by the process of this invention may be used in the sizing and waterproofing of paper and other fibrous materials, and in other ways.

Emulsifiable compounds occur naturally in many types of crude oils and may be separated therefrom by appropriate means. Methods have been devised for the oxidation of crude petroleum fractions by which are obtained acids resembling the animal and vegetable fatty acids in odor, consistency and many physical properties.

In the oxidation of polymers of cracked gasoline by the method herein proposed, however, compounds are obtained which show certain markedly different characteristics from any heretofore prepared. For instance, these compounds are practically insoluble at room temperature in ordinary straight run gasoline or heavier petroleum distillates, whereas synthetic acids made from crude petroleum are definitely soluble. When freed of water and/or naphtha-soluble components, these compounds are hard, brittle substances, as distinguished from other types of oxidized hydrocarbons, which are oily or greasy. Furthermore, the aluminium precipitates of the compounds treated as hereinafter described are decidedly soluble in absolute ethyl alcohol, as distinguished from the synthetic and natural fatty acids, whose aluminium soaps possess slight, if any, solubility in such solvent. The compounds herein described are heat-unstable and tend to decompose under ordinary pressure at a temperature of 250° F. While synthetic acids made according to prior processes generally lack the thermo-stability of the animal and vegetable fatty acids, still they are decidedly stable at 250° F.

The difference between the compounds whose preparation is herein described and synthetic oxidation products of crude petroleum or fractions therefrom, resides less in the method of manufacturing than in the unique nature of the starting material which I use. While polymers from any cracked gasolines may be used, I prefer to use those polymers resulting from the treatment of vapor phase cracked gasoline with active contact masses, such as diatomaceous earth, silica gel and the like due to their relatively high unsaturation and resulting ease of oxidation.

The method by which I prepare my emulsifiable compounds is to subject said polymers, in liquid phase, to the action of molecular oxygen at ordinary or superatmospheric pressures at temperatures up to 220° F., preferably in the presence of a small quantity of a soluble siccative metal soap, such as manganese linoleate. A sample of the polymers under treatment may be tested every two hours by mixing one part of said polymer with two parts of cold V. M. & P. naphtha, and determining the proportion of precipitate formed. The treatment of the polymers may be concluded at any time, but it is economically feasible to conclude treatment when the tests just described fail to show any appreciable increase (more than 5% increase in weight of precipitate) in naphtha-insoluble component. The naphtha precipitation test has meaning, however, only after oxidation has gotten under way.

When oxidation is concluded, the oxidized polymers are further treated with an alkali metal hydroxide or carbonate dissolved in water or other suitable solvent, and this treatment continues, preferably at temperatures between 150° and 220° F., until a solid or semi-solid mass is formed which will form a 2% oil-in-water emulsion when treated with boiling water, provided sufficient water has not already been added along with the alkali base to form a complete or partially complete emulsion.

The character of this emulsion varies with the intensity of the alkali treatment. Alkali metal carbonates tend to produce compounds which form brown opaque emulsions, whereas alkali metal hydroxides produce compounds whose emulsions are a deeper brown and more translucent than those formed by the carbonate treated material.

It will be found that the oxidation of the polymers heretofore referred to proceeds more quickly with increased oxygen pressure. A moderate increase in temperature also tends to speed up oxidation, although the temperature should not be so high as to cause an appreciable break-down of the oxidized compounds formed. The amount of siccative metal soap which may be added can vary at the discretion of the operator, without markedly affecting the nature of the final product. Metals such as cobalt, manganese, lead, chromium and others act as oxidation catalysts in the present reaction. Before the treatment with the alkali, the oxidized portion of the polymers may be separated from the unoxidized or incompletely oxidized portions thereof by decantation, or more completely by treatment with straight run petroleum distillates, such as naphtha, in which such oxidized compounds are largely insoluble. The thus precipitated compounds may then be treated with the alkali, as the emulsifiable fraction of the polymers resides mainly in the naphtha-insoluble portion thereof. The amount of alkali used in the treatment should exceed the theoretical quantity calculated from the acid number of the oxidized polymers, and for characteristic results should equal or exceed the quantity theoretically required for saponification. The acid number and saponification number may be obtained by the conventional means used in determining the acid number and saponification number of rosin, vegetable oils, soaps, and the like.

It has been found distinctly advantageous to keep the solids content of the polymers to be treated below 60%. When the solids content of the polymers rises above this value, the rate of oxidation appears to decrease markedly. On the other hand, where the solids content of the polymers lies below, let us say, 10%, the oxidation process tends to become uneconomical. A solids content of 40% for the polymers to be treated has been found by me to be an easily oxidizable and economical concentration. I do not wish, however, to be limited to the figures just quoted but give them merely as illustrative and for the guidance of those who wish to practice the art.

A concrete example of the method which I employ follows: One thousand parts by weight of polymers of 40% solids content (as measured by the standard A. S. T. M. test for varnish testing) was admixed with a solution containing a half part of manganese metal in soap combination, and blown at 175° F. with a brisk current of air which was sufficient to cause violent agitation of the polymers. These polymers had been prepared by allowing vapors from unrefined vapor phase cracked gasoline to pass through a bed of active clay at a temperature between 300° and 400° F., the polymers having been drained from the base of the clay tower and fractionated until the residue contained 40% solids. During the blowing of the polymers which took place in a still connected with a series of condensing coils, a considerable portion of the volatile ingredients of the polymers was evaporated and condensed. These condensed portions were returned periodically to the residual polymers in the still; and blowing was continued for twenty-four hours, at which time the formation of naphtha-insoluble oxidized polymers had largely ceased. The acid number of the thus oxidized polymers, calculated on the percentage of solids present, proved to be 25 and the saponification number 100. Thereupon, 35 parts by weight of caustic soda dissolved in 140 parts of water—or, roughly, five times the quantity of caustic soda required for neutralization of the free acids present, was added to the polymers and the entire mass agitated by air at 175° F., for two hours. Five hundred parts of water was thereupon added, and the mass allowed to cool and was found to have formed three layers. The top layer was composed entirely of unoxidized or incompletely oxidized polymers. The middle layer represented an alkaline water solution which contained a certain amount of organic material. The lower layer was a semi-solid mass of emulsifiable oxidized polymers. This lower layer was separated and washed with naphtha to remove traces of unoxidized poylmers and was thereupon ready for use, which contained approximately 25% water and other volatile ingredients.

The unoxidized polymer layer as well as the aqueous alkaline layer may be reworked, if desired. If it is decided to use sodium carbonate instead of sodium hydroxide in the example given, 40 parts of carbonate may be added to 160 parts of water, which solution is then added to the oxidized polymers and the mixture agitated at 210° F. for approximately four hours. If desired, the oxidation and subsequent alkali treatment of the polymers may be carried out with admixtures of vegetable and/or marine drying oils, or other substances with which the polymers are miscible.

I claim as my invention:

1. In the preparation of emulsifiable compounds from naphtha-insoluble oxidized hydrocarbons, the steps which comprise subjecting polymers resulting from the polymerization of cracked gasoline by means of active contact masses to the action, in liquid phase, of molecular oxygen at temperatures below approximately 220° F., to form oxidized polymers which are insoluble in naphtha, subjecting said oxidized polymers to the action of a solution of an alkali metal base and recovering the emulsifiable oxidized polymers.

2. In the preparation of emulsifiable compounds from naphtha-insoluble oxidized hydrocarbons, the steps which comprise subjecting polymers resulting from the polymerization of vapor phase cracked gasoline by means of active contact masses to the action, in liquid phase, of molecular oxygen at temperatures below approximately 220° F., to form oxidized polymers which are insoluble in naphtha, subjecting said oxidized polymers to the action of a solution of an alkali metal base and recovering the emulsifiable oxidized polymers.

3. In the preparation of emulsifiable compounds from naphtha-insoluble oxidized hydrocarbons, the steps which comprise subjecting polymers resulting from the polymerization of cracked gasoline by means of active contact masses to the action, in liquid phase, and in the presence of a siccative metal soap, of molecular oxygen at temperatures below approximately 220° F., to form oxidized polymers which are insoluble in naphtha, subjecting said oxidized polymers to the action of a solution of an alkali metal base and recovering the emulsifiable oxidized polymers.

4. In the preparation of emulsifiable compounds from naphtha-insoluble oxidized hydrocarbons, the steps which comprise subjecting polymers resulting from the polymerization of cracked gasoline by means of active contact masses, and having a solids content between 10% and 60%, to the action, in liquid phase, and in the presence of a siccative metal soap, of molecular oxygen at temperatures below approximately 220° F., to form oxidized polymers which are insoluble in naphtha, subjecting said oxidized polymers to the action of a solution of an alkali metal base and recovering the emulsifiable oxidized polymers.

5. In the preparation of emulsifiable compounds from naphtha-insoluble oxidized hydrocarbons, the steps which comprise subjecting polymers resulting from the polymerization of cracked gasoline by means of active contact masses, and having a solids content of approximately 40%, to the action, in liquid phase, and in the presence of a siccative metal soap, of molecular oxygen at temperatures below approximately 220° F., to form oxidized polymers which are insoluble in naphtha, subjecting said oxidized polymers to the action of a solution of an alkali metal base and recovering the emulsifiable oxidized polymers.

6. In the preparation of emulsifiable oxidized hydrocarbons, the steps which comprise subjecting polymers resulting from the polymerization of vapor phase cracked gasoline by means of active contact masses having a solids content of between 10% and 60% to the action, in liquid phase, and in the presence of a siccative metal soap, of molecular oxygen at temperatures below approximately 220° F. to cause violent agitation of the polymers, precipitating the oxidized polymers by the addition of a straight run petroleum distillate, separating the precipitate comprising the oxidized polymers, thereafter subjecting said precipitate to the action of a solution of an alkali metal base, and recovering the emulsifiable oxidized polymers.

7. In the preparation of emulsifiable compounds from naphtha-insoluble oxidized hydrocarbons, the steps which comprise subjecting polymers resulting from the polymerization of cracked gasoline by means of active contact masses to the action, in liquid phase, of molecular oxygen at superatmospheric pressure and temperatures below approximately 220° F., to form oxidized polymers which are insoluble in naphtha, subjecting said oxidized polymers to the action of a solution of an alkali metal base, and recovering the emulsifiable oxidized polymers.

8. In the preparation of emulsifiable compounds from naphtha-insoluble oxidized hydrocarbons, the steps which comprise subjecting polymers resulting from the polymerization of cracked gasoline by means of active contact masses to the action, in liquid phase, and in the presence of a manganese soap, of molecular oxygen at temperatures below approximately 220° F., to form oxidized polymers which are insoluble in naphtha, subjecting said oxidized polymers to the action of a solution of an alkali metal base and recovering the emulsifiable oxidized polymers.

9. In the preparation of emulsifiable compounds from naphtha-insoluble oxidized hydrocarbons, the steps which comprise subjecting polymers resulting from the polymerization of cracked gasoline by means of active contact masses to the action, in liquid phase, of molecular oxygen at temperatures below approximately 220° F., to form oxidized polymers which are insoluble in naphtha, subjecting said oxidized polymers to the action of a solution of an alkali metal hydroxide, and recovering the emulsifiable oxidized polymers.

10. In the preparation of emulsifiable compounds from naphtha-insoluble oxidized hydrocarbons, the steps which comprise subjecting polymers resulting from the polymerization of cracked gasoline by means of active contact masses to the action, in liquid phase, of molecular oxygen at temperatures below approximately 220° F., to form oxidized polymers which are insoluble in naphtha, subjecting said oxidized polymers to the action of a solution of an alkali metal carbonate, and recovering the emulsifiable oxidized polymers.

11. In the preparation of emulsifiable compounds from naphtha-insoluble oxidized hydrocarbons, the steps which comprise subjecting polymers resulting from the polymerization of cracked gasoline by means of active contact masses to the action, in liquid phase, of molecular oxygen at temperatures below approximately 220° F., to form oxidized polymers which are insoluble in naphtha, subjecting said oxidized polymers to the action of a solution of an alkali metal base while agitating the mass at a temperature below 220° F., and recovering the emulsifiable oxidized polymers.

12. An emulsifiable compound from naphtha-insoluble oxidized hydrocarbons which are heat-unstable and tend to decompose at atmospheric pressure at a temperature of 250° F. derived from the atmospheric oxidation and subsequent alkali treatment of the polymers resulting from the polymerization of cracked gasoline by means of active contact masses.

13. An emulsifiable compound from naphtha-insoluble oxidized hydrocarbons which are heat-unstable and tend to decompose at atmospheric pressure at a temperature of 250° F., derived from the atmospheric oxidation and subsequent alkali treatment of the polymers resulting from the polymerization of vapor phase cracked gasoline by means of active contact masses.

14. An emulsifiable compound from naphtha-insoluble oxidized hydrocarbons which are heat-unstable and tend to decompose at atmospheric pressure at a temperature of 250° F., derived from the atmospheric oxidation and subsequent alkali treatment of the polymers resulting from the polymerization of cracked gasoline by means of active contact masses, characterized in that the aluminium precipitates of said oxidized hydrocarbons are soluble in absolute ethyl alcohol.

JULIUS HYMAN.